(12) United States Patent
Furuta et al.

(10) Patent No.: US 12,545,618 B2
(45) Date of Patent: Feb. 10, 2026

(54) CHEMICALLY STRENGTHENED GLASS

(71) Applicant: AGC Inc., Tokyo (JP)

(72) Inventors: Hitomi Furuta, Tokyo (JP); Qing Li, Tokyo (JP); Shigeki Sawamura, Tokyo (JP); Shusaku Akiba, Tokyo (JP)

(73) Assignee: AGC INC., Tokyo (JP)

( * ) Notice: Subject to any disclaimer, the term of this patent is extended or adjusted under 35 U.S.C. 154(b) by 554 days.

(21) Appl. No.: 18/110,357

(22) Filed: Feb. 15, 2023

(65) Prior Publication Data

US 2023/0192531 A1    Jun. 22, 2023

Related U.S. Application Data

(63) Continuation of application No. PCT/JP2021/029356, filed on Aug. 6, 2021.

(30) Foreign Application Priority Data

Aug. 19, 2020  (JP) ................. 2020-138625

(51) Int. Cl.
| | | |
|---|---|---|
| *B32B 15/04* | (2006.01) | |
| *B32B 17/06* | (2006.01) | |
| *C03C 3/097* | (2006.01) | |
| *C03C 21/00* | (2006.01) | |

(52) U.S. Cl.
CPC ............ *C03C 3/097* (2013.01); *C03C 21/002* (2013.01)

(58) Field of Classification Search
CPC .................................................. C03C 21/002
USPC ................................................ 428/410, 426
See application file for complete search history.

(56) References Cited

U.S. PATENT DOCUMENTS

| | | | |
|---|---|---|---|
| 2016/0357294 A1* | 12/2016 | Ozeki ..................... | B32B 17/06 |
| 2017/0347464 A1 | 11/2017 | Hashizume et al. | |
| 2018/0071881 A1* | 3/2018 | Horie ...................... | B24B 13/01 |
| 2018/0170800 A1 | 6/2018 | Inamoto et al. | |
| 2018/0251398 A1* | 9/2018 | Ikegami .................. | C03C 17/25 |
| 2019/0205597 A1* | 7/2019 | Tomeno ................ | G06F 1/1656 |
| 2020/0156994 A1 | 5/2020 | Li et al. | |
| 2020/0199020 A1* | 6/2020 | Hatano ................. | C03C 21/002 |
| 2020/0207660 A1 | 7/2020 | Li et al. | |
| 2020/0239354 A1 | 7/2020 | Li et al. | |

FOREIGN PATENT DOCUMENTS

| | | |
|---|---|---|
| CN | 206143062 U | 5/2017 |
| EP | 0 933 377 A2 | 8/1999 |
| JP | 2000-144097 A | 5/2000 |
| JP | 2014-139113 A | 7/2014 |

(Continued)

OTHER PUBLICATIONS

International Searching Authority, "International Search Report," issued in connection with International Patent Application No. PCT/JP2021/029356, dated Sep. 7, 2021.

(Continued)

*Primary Examiner* — Lauren R Colgan
(74) *Attorney, Agent, or Firm* — Foley & Lardner LLP (57) ABSTRACT

The present invention relates to a chemically strengthened glass having a sheet shape, in which a haze in terms of a thickness of 0.70 mm is 1.0% or less, and on at least one main surface of the glass, a ratio (Rku/Hv)×1000 of kurtosis Rku of surface unevenness to Vickers hardness Hv is 1 or more and 4.4 or less.

10 Claims, 2 Drawing Sheets

(56) References Cited

FOREIGN PATENT DOCUMENTS

| JP | 2016-053204 A | 4/2016 |
|----|---------------|--------|
| WO | WO-2016/104420 A1 | 6/2016 |
| WO | WO-2017/029890 A1 | 2/2017 |
| WO | WO-2019/022035 A1 | 1/2019 |

OTHER PUBLICATIONS

International Searching Authority, "Written Opinion," issued in connection with International Patent Application No. PCT/JP2021/029356, dated Sep. 7, 2021.

* cited by examiner

CHEMICALLY STRENGTHENED GLASS

CROSS-REFERENCE TO RELATED APPLICATIONS

This is a bypass continuation of International Patent Application No. PCT/JP2021/029356, filed on Aug. 6, 2021, which claims priority to Japanese Patent Application No. 2020-138625, filed on Aug. 19, 2020. The contents of these applications are hereby incorporated by reference in their entireties.

TECHNICAL FIELD

The present invention relates to a chemically strengthened glass.

BACKGROUND ART

In recent years, a cover glass made of a chemically strengthened glass has been used for a purpose of protecting a display device such as a mobile phone, a smartphone, or a tablet terminal and improving an appearance thereof.

Since a touch panel used in a smartphone or the like is touched by a finger of a person during use, dirt due to a fingerprint or the like is likely to adhere to the touch panel, and thus antifouling properties are required. In addition, the touch panel is also required to have operability when operated with a finger.

For example, Patent Literature 1 describes that a fluorine-containing organosilicon compound is used as a coating for improving antifouling properties and finger slipping properties.

CITATION LIST

Patent Literature

Patent Literature 1: JP2000-144097A

SUMMARY OF INVENTION

Technical Problem

However, a coating film of a fluorine-containing organic silicon compound or the like may be peeled off, and improvement in film adhesion between the cover glass and the coating film is required.

In view of the above circumstances, an object of the present invention is to provide a chemically strengthened glass having excellent film adhesion to a coating film.

Solution to Problem

The present inventors have found that it is effective to form appropriate unevenness on a glass surface in order to prevent peeling of a coating film, and have completed the present invention.

That is, the present invention provides a chemically strengthened glass having a sheet shape, in which
a haze in terms of a thickness of 0.70 mm is 1.0% or less, and
on at least one main surface of the glass, a ratio (Rku/Hv)×1000 of kurtosis Rku of surface unevenness to Vickers hardness Hv is 1 or more and 4.4 or less.

The chemically strengthened glass of the present invention is a chemically strengthened glass having a sheet shape, in which
on at least one main surface of the glass, a height frequency distribution of surface unevenness is fitted by two or more normal distribution functions.

The chemically strengthened glass of the present invention is preferably a glass ceramic.

The chemically strengthened glass of the present invention preferably includes $SiO_2$—$Al_2O_3$—$Li_2O$-based crystals.

The chemically strengthened glass of the present invention preferably includes one or more crystals selected from the group consisting of $LiAlSi_2O_6$, $Li_2Si_2O_5$, and $Al_6O_{13}Si_2$.

In the chemically strengthened glass of the present invention, a base composition preferably includes, in terms of molar percentage based on oxides:
40% to 80% of $SiO_2$;
3% to 30% of $Al_2O_3$;
0% to 5% of $P_2O_5$;
0% to 10% of $B_2O_3$;
5% to 40% of $Li_2O$;
0% to 10% of $Na_2O$;
0% to 5% of $K_2O$;
0% to 5% of MgO;
0% to 5% of CaO;
0% to 5% of SrO;
0% to 5% of BaO;
1% to 5% of $ZrO_2$;
0% to 4% of $SnO_2$; and
0% to 4% of $Y_2O_3$.

Advantageous Effects of Invention

According to the present invention, since surface unevenness of a glass is appropriately controlled during glass formation, a chemically strengthened glass having good film adhesion to a coating film can be obtained.

DESCRIPTION OF EMBODIMENTS

In the present specification, the expression "to" indicating a numerical range is used to include numerical values described therebefore and thereafter as a lower limit value and an upper limit value. Hereinafter, the expression "to" in the present specification is used with the same meaning unless otherwise specified.

In the present specification, the term "chemically strengthened glass" refers to a glass after being subjected to a chemical strengthening treatment, and the term "glass for chemical strengthening" refers to a glass before being subjected to a chemical strengthening treatment.

In the present specification, the term "base composition of the chemically strengthened glass" is a glass composition of the glass for chemical strengthening. In the chemically strengthened glass, a glass composition at a depth of ½ of a sheet thickness t is the same as the base composition of the chemically strengthened glass except for a case where an extreme ion exchange treatment is performed.

In the present specification, the glass composition is expressed in terms of molar percentage based on oxides unless otherwise specified, and mol % is simply expressed as "%".

In addition, in the present specification, "not substantially contained" means that an amount of a component is equal to or lower than a level of an impurity contained in a raw material or the like, that is, the component is not intentionally contained. Specifically, the amount is, for example, less than 0.1 mol %.

In the present specification, the term "stress profile" represents a compressive stress value with a depth from a glass surface as a variable. The term "depth of a compressive stress layer (DOL)" is a depth at which a compressive stress value (CS) is zero. The term "internal tensile stress value (CT)" refers to a tensile stress value at a depth of ½ of the sheet thickness t of the glass. In the present specification, the tensile stress value is expressed as a negative compressive stress value.

The stress profile in the present specification can be measured using a scattered light photoelastic stress meter (for example, SLP-1000 manufactured by Orihara Industrial Co., Ltd.). The scattered light photoelastic stress meter is affected by surface scattering, and measurement accuracy in a vicinity of a sample surface may decrease. However, for example, in a case where a compressive stress is generated only by ion exchange between lithium ions in a glass and external sodium ions, a compressive stress value represented by a function of a depth follows a complementary error function, and thus a stress value of a surface can be known by measuring an internal stress value. When the compressive stress value expressed by the function of the depth does not follow the complementary error function, the surface portion is measured by another method (for example, a method of measuring with a surface stress meter).

<Chemically Strengthened Glass>

The chemically strengthened glass of the present invention (hereinafter, also referred to as "the present chemically strengthened glass") preferably has a sheet shape. That is, the present chemically strengthened glass preferably has a first main surface, a second main surface facing the first main surface, and end portions in contact with the first main surface and the second main surface. The present chemically strengthened glass has, for example, a flat sheet shape in which the first main surface and the second main surface are parallel to each other, but the first main surface and the second main surface may not be parallel to each other, and a part or all of one or both of the two main surfaces may be curved surfaces. The present chemically strengthened glass has a haze of 1.0% or less, and on at least one main surface, a ratio (Rku/Hv)×1000 of kurtosis Rku of surface unevenness to Vickers hardness Hv is 1 or more and 4.4 or less.

A thickness (t) of the present chemically strengthened glass is, for example, 2 mm or less, preferably 1.5 mm or less, more preferably 1 mm or less, still more preferably 0.9 mm or less, particularly preferably 0.8 mm or less, and most preferably 0.7 mm or less. In order to obtain sufficient strength, the thickness is, for example, 0.1 mm or more, preferably 0.2 mm or more, more preferably 0.4 mm or more, still more preferably 0.5 mm or more, and particularly preferably 0.6 mm or more.

In the present chemically strengthened glass, the kurtosis Rku of the surface unevenness represents the degree of peakedness of a height frequency distribution of the unevenness of a glass surface. When Rku=3, the surface unevenness shows a normal distribution, when Rku<3, the height frequency distribution of the surface unevenness becomes a collapsed shape, and when Rku>3, the height distribution becomes a sharp shape.

It is known that when a glass is polished under the same conditions, there is a correlation between the hardness of the glass and the roughness of the glass surface after polishing. Therefore, the surface unevenness of the present chemically strengthened glass can be evaluated by Rku per unit hardness.

That is, on at least one main surface of the present chemically strengthened glass, the ratio (Rku/Hv)×1000 of the kurtosis Rku of the surface unevenness to the Vickers hardness Hv is 1 or more and 4.4 or less. When (Rku/Hv)×1000 is 4.4 or less, Rku is relatively small with respect to the hardness of the glass, and the glass does not have an excessively sharp shape. If the height frequency distribution is collapsed to some extent, the deviation of the frequency of the surface unevenness to a specific height is relatively small. Accordingly, a flat region in the surface unevenness is relatively small, and the uneven surface tends to include a plurality of patterns of uneven shapes or to include an irregular uneven shape, and tends to be less likely to be formed only by repeating a specific uneven shape. The present chemically strengthened glass can increase a surface area of the glass surface by having such surface unevenness, and is considered to have excellent film adhesion to the coating film. (Rku/Hv)×1000 is more preferably 4 or less, still more preferably 3.8 or less, and particularly preferably 3.6 or less.

From the same viewpoint, (Rku/Hv)×1000 is 1 or more. If the height frequency distribution has an excessively collapsed shape, the deviation of the frequency of the surface unevenness to a specific height tends to be excessively small. In this case, various unevenness degrees are included, and, for example, resulting in a state where very fine unevenness is present in a large undulation. And thus, the flat region in the surface unevenness is rather large, and the surface area of the glass surface tends to be relatively small. When (Rku/Hv)×1000 is 1 or more, as described above, the surface unevenness is likely to include a plurality of patterns of uneven shapes or to include an irregular uneven shape, and thus the surface area can be increased. (Rku/Hv)×1000 is more preferably 1.5 or more, still more preferably 2 or more, and particularly preferably 2.5 or more.

Figure 1:
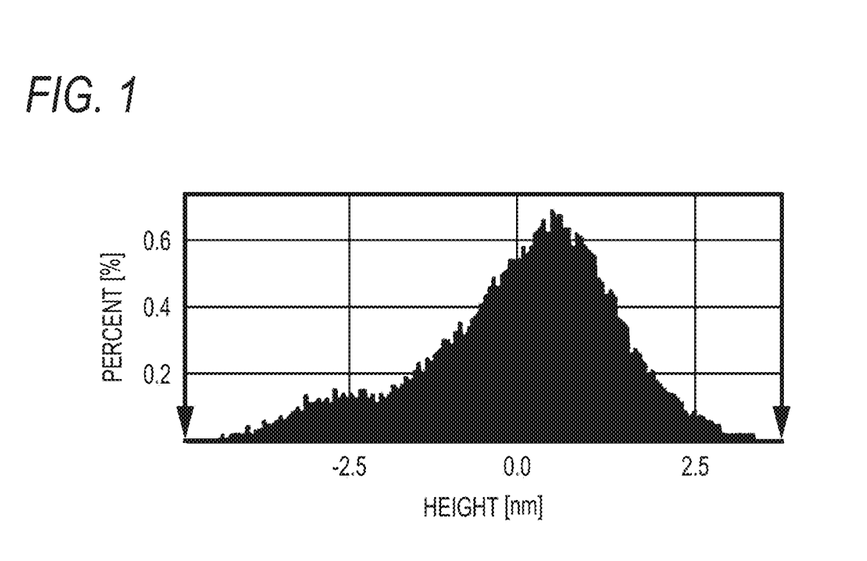
FIG. 1 is a diagram showing a height frequency distribution of a chemically strengthened glass of Example 1.
Figure 2:
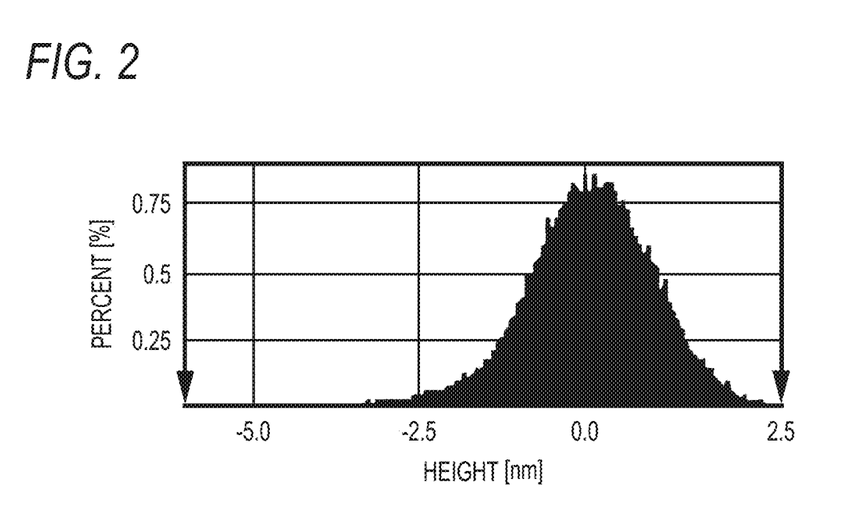
FIG. 2 is a diagram showing a height frequency distribution of a chemically strengthened glass of Example 2.

On at least one main surface of the present chemically strengthened glass, the height frequency distribution of the surface unevenness is preferably fitted by two or more normal distribution functions. FIG. 1 is a diagram showing a height frequency distribution of a chemically strengthened glass of Example 1 in Examples, and is an example of a case where the height frequency distribution is fitted by two normal distribution functions. FIG. 2 is a diagram showing a height frequency distribution of a chemically strengthened glass of Example 2, and is an example of a case where the height frequency distribution is fitted by one normal distribution function.

That is, when the height frequency distribution of the surface unevenness is fitted by two or more normal distribution functions, the variation of the height frequency distribution tends to be large, and the deviation of the frequency of the surface unevenness to a specific height tends to be moderately small, compared to a case where the height frequency distribution of the surface unevenness is fitted by one normal distribution function. Accordingly, it is considered that the film adhesion of the present chemically strengthened glass is easily improved.

Rku in the present chemically strengthened glass is preferably 4.4 or less, more preferably 4 or less, still more preferably 3.8 or less, and particularly preferably 3.6 or less, from the viewpoint of improving film adhesion. A lower limit of Rku is preferably 1.0 or more, more preferably 1.5 or more, still more preferably 2.0 or more, and particularly preferably 2.5 or more, also from the viewpoint of improving film adhesion.

Rku can be calculated in accordance with JIS B0601 (2001) by measuring surface unevenness using, for example, an atomic force microscope (AFM).

The arithmetic average roughness Ra of the present chemically strengthened glass is preferably 0.05 nm or more, and more preferably 0.1 nm or more, from the viewpoint of improving film adhesion. In addition, Ra is preferably 10 nm or less, more preferably 5 nm or less, and still more preferably 1 nm or less from the viewpoint of an aesthetic appearance. The arithmetic average roughness Ra can be measured in accordance with JIS B0601 (2001).

The expression "the present chemically strengthened glass is excellent in film adhesion" means that the peel resistance of the antifouling layer measured by the following method is excellent. The peel resistance of the antifouling layer can be evaluated by a method in which the antifouling layer is formed on the glass surface, "eraser friction abrasion" is applied thereto, and then a contact angle of a water droplet is measured. It can be said that as a water contact angle after the eraser friction increases, the function of the antifouling layer is maintained, and the peel resistance is more excellent.

Specifically, the peel resistance of the antifouling layer can be evaluated, for example, by measuring a contact angle of a water droplet after eraser friction abrasion by the following method.

(Eraser Friction Abrasion)

A cylindrical eraser having a diameter of 6 mm is attached to an abrasion tester, and a surface of the antifouling layer is abraded 7500 times under the conditions of a load of 1 kgf, a stroke width of 40 mm, a speed of 40 rpm, and 25° C. and 50% RH.

(Measurement of Water Contact Angle)

A water droplet of about 1 µL of pure water is dropped on a surface after the eraser friction, and a contact angle with respect to water is measured using a contact angle meter. It can be said that as the water contact angle after friction abrasion increases, durability of the antifouling layer is more excellent. Specifically, for example, a difference between the water contact angle before abrasion and the water contact angle after abrasion is preferably 60° or less, more preferably 50° or less, and still more preferably 40° or less.

(Chemical Strengthening Properties)

A surface compressive stress value $CS_0$ of the present chemically strengthened glass is preferably 400 MPa or more, more preferably 450 MPa or more, still more preferably 500 MPa or more, yet still more preferably 550 MPa or more, particularly preferably 600 MPa or more, further particularly preferably 700 MPa or more, and most preferably 800 MPa or more.

As the surface compressive stress value increases, the strength increases. However, when the surface compressive stress value is too large, a large tensile stress may be generated inside the chemically strengthened glass and may lead to breakage, and thus the surface compressive stress value is preferably 1200 MPa or less, and more preferably 1100 MPa or less.

In a stress profile of the present chemically strengthened glass, a compressive stress value $CS_{50}$ at a depth of 50 µm from a surface is preferably 50 MPa or more, more preferably 100 MPa or more, still more preferably 150 MPa or more, and particularly preferably 200 MPa or more. When the $CS_{50}$ is large, the chemically strengthened glass is less likely to crack when damaged due to dropping or the like.

An internal tensile stress value CT of the present chemically strengthened glass is preferably 150 MPa or less, more preferably 130 MPa or less, and still more preferably 100 MPa or less. When the CT is small, crushing hardly occurs. The internal tensile stress value CT is preferably 50 MPa or more, more preferably 60 MPa or more, and still more preferably 70 MPa or more. When the CT is equal to or greater than the above value, the compressive stress in a vicinity of the surface increases, and the strength increases.

When a depth of a compressive stress layer DOL of the present chemically strengthened glass is too large with respect to the thickness t, the CT is increased, and thus the DOL is preferably 0.2t or less, more preferably 0.19t or less, and still more preferably 0.18t or less. In addition, from the viewpoint of improving the strength, the DOL is preferably 0.06t or more, more preferably 0.08t or more, still more preferably 0.10t or more, and particularly preferably 0.12t or more. Specifically, for example, the DOL is preferably 180 µm or less, and more preferably 160 µm or less. In addition, the DOL is preferably 60 µm or more, more preferably 80 µm or more, and still more preferably 100 µm or more.

The present chemically strengthened glass is preferably glass ceramic. The present chemically strengthened glass is preferably glass ceramic because hardness is likely to increase, fracture toughness is improved, and scratches are less likely to extend.

The present chemically strengthened glass preferably contains any one or more of a lithium silicate crystal, a lithium aluminosilicate crystal, an aluminosilicate crystal, and a lithium phosphate crystal. From the viewpoint of improving chemical strengthening properties, that is, from the viewpoint of improving the strength of the present chemically strengthened glass, it is more preferable to contain lithium aluminosilicate crystals, that is, $SiO_2$—$Al_2O_3$—$Li_2O$ based crystals.

The lithium aluminosilicate crystal is preferably, for example, a petalite crystal, a β-spodumene crystal ($LiAlSi_2O_6$), or a β-quartz solid solution. The lithium silicate crystal is preferably, for example, a lithium metasilicate crystal or a lithium disilicate crystal ($Li_2Si_2O_5$). The lithium phosphate crystal is preferably, for example, a lithium orthophosphate crystal. The aluminosilicate crystal is preferably, for example, mullite ($Al_6O_{13}Si_2$).

The glass ceramics are obtained by heating and crystallizing an amorphous glass. A glass composition of the glass ceramics is the same as a composition of the amorphous glass.

In the present chemically strengthened glass, a visible light transmittance (a total visible light transmittance including diffuse transmitted light) is preferably 85% or more in terms of a thickness of 0.70 mm, as a screen of a display can be easily seen when the present chemically strengthened glass is used as a cover glass of a portable display. The visible light transmittance is more preferably 88% or more, and still more preferably 90% or more. The visible light transmittance is preferably as high as possible, but is generally 93% or less. A visible light transmittance of a normal amorphous glass is about 90% or more.

When the thickness of the glass ceramics is not 0.70 mm, the visible light transmittance in a case of 0.70 mm can be calculated using Lambert-Beer law based on the measured transmittance.

In a case where the total visible light transmittance of the present glass having a sheet thickness of t [mm] is 100×T [%] and the surface reflectance of one surface thereof is 100×R [%], a relationship of $T=(1-R)^2 \times \exp(-\alpha t)$ is established using a constant $\alpha$ by incorporating Lambert-Beer law.

Here, if $\alpha$ is represented by R, T, and t, and t=0.70 mm, R does not change depending on the sheet thickness, and thus, the total visible light transmittance $T_{0.7}$ in terms of 0.70 mm can be calculated as $T_{0.7=100} \times T^{0.7/t}(1-R)^{\wedge}(1.4/t-2)$ [%]. Here, X^Y represents $X^Y$.

The surface reflectance may be determined by calculation from a refractive index or may be actually measured.

In the case of the glass having the sheet thickness t larger than 0.70 mm, the visible light transmittance may be actually measured by adjusting the sheet thickness to 0.70 mm by polishing, etching, or the like. In the chemically strengthened glass, the visible light transmittance before and after the chemical strengthening is substantially the same, and the transmittance does not greatly change even when the ion exchanged layer on the surface is removed by polishing or the like.

In addition, a haze value of the present chemically strengthened glass in terms of a thickness of 0.70 mm is 1.0% or less. When the haze value is 1.0% or less, for example, a screen of a display can be easily seen in a case of being used as a cover glass of a portable display.

The haze value is preferably 0.4% or less, more preferably 0.3% or less, still more preferably 0.2% or less, and particularly preferably 0.15% or less. The haze value is preferably as small as possible, but when a crystallization rate is lowered or a crystal grain size is decreased in order to decrease the haze value, mechanical strength is reduced. In order to increase the mechanical strength, the haze value in the case of a thickness of 0.70 mm is preferably 0.02% or more, and more preferably 0.03% or more. The haze value is a value measured in accordance with JIS K7136 (2000).

When the total visible light transmittance of the glass ceramics having a sheet thickness t [mm] is 100×T [%] and the haze value is 100×H [%], $dH/dt \propto \exp(-\alpha t) \times (1-H)$ can be established using the above constant $\alpha$ by incorporating Lambert-Beer law.

That is, the haze value is considered to increase by an amount proportional to an internal linear transmittance as the sheet thickness increases, and thus, the haze value $H_{0.7}$ in the case of 0.70 mm is determined by the following formula. Here, "X^Y" represents "$X^Y$".

$$H_{0.7}=100\times[1-(1-H)^{\wedge}\{((1-R)^2-T_{0.7})/((1-R)^2-T)\}][\%]$$

In the case of the glass having the sheet thickness t larger than 0.70 mm, the haze value may be actually measured by adjusting the sheet thickness to 0.70 mm by polishing, etching, or the like.

When the present chemically strengthened glass is used for a cover glass of a portable display, the present chemically strengthened glass preferably has a texture and high quality appearance different from plastic. Therefore, the refractive index of the present chemically strengthened glass is preferably 1.52 or more, more preferably 1.55 or more, and still more preferably 1.57 or more at a wavelength of 590 nm.

When the present chemically strengthened glass is the glass ceramics, in order to increase the mechanical strength, the crystallization rate is preferably 5% or more, more preferably 10% or more, still more preferably 15% or more, and particularly preferably 20% or more. In order to increase transparency, the crystallization ratio is preferably 70% or less, more preferably 60% or less, and particularly preferably 50% or less. A small crystallization rate is also excellent to facilitate bending by heating.

The crystallization rate can be calculated by a Rietveld method based on an X-ray diffraction intensity. The Rietveld method is described in "Crystal Analysis Handbook" edited by Editing Committee of the Crystallographic Society of Japan (Kyoritsu Shuppan, 1999, pp. 492-499).

An average grain size of precipitated crystals of the glass ceramics is preferably 80 nm or less, more preferably 60 nm or less, still more preferably 50 nm or less, particularly preferably 40 nm or less, and most preferably 30 nm or less. The average grain size of the precipitated crystals is determined from a transmission electron microscope (TEM) image. The average grain size of the precipitated crystals can be estimated from a scanning electron microscope (SEM) image.

An average thermal expansion coefficient of the present chemically strengthened glass at 50° C. to 350° C. is preferably $90 \times 10^{-7}$/° C. or more, more preferably $100 \times 10^{-7}$/° C. or more, still more preferably $110 \times 10^{-7}$/° C. or more, particularly preferably $120 \times 10^{-7}$/° C. or more, and most preferably $130 \times 10^{-7}$/° C. or more.

When the thermal expansion coefficient is too large, cracking may occur due to a difference in thermal expansion coefficient in a process of chemical strengthening. Therefore, the thermal expansion coefficient is preferably $160 \times 10^{-7}$/° C. or less, more preferably $150 \times 10^{-7}$/° C. or less, and still more preferably $140 \times 10^{-7}$/° C. or less.

In order to increase wear resistance of the present chemically strengthened glass, the Vickers hardness Hv is preferably 600 or more, more preferably 700 or more, still more preferably 730 or more, particularly preferably 750 or more, and most preferably 780 or more. When the present chemically strengthened glass is glass ceramics, the hardness tends to increase because the glass contains crystals. For this reason, damage is less likely to occur, and wear resistance is also excellent.

When the hardness is too high, it is difficult to process, and thus, the Vickers hardness Hv of the present chemically strengthened glass is preferably 1100 or less, more preferably 1050 or less, and still more preferably 1000 or less.

In the present specification, the Vickers hardness Hv refers to the Vickers hardness (Hv 0.1) defined in JIS R1610: 2003.

The fact that a Young's modulus of the present chemically strengthened glass is high means that the bonding strength of elements constituting the glass is high, and means that a large force is required to cut the glass. The Young's modulus is preferably 85 GPa or more, more preferably 90 GPa or more, still more preferably 95 GPa or more, and particularly preferably 100 GPa or more. In addition, from the viewpoint of preventing an increase in tensile stress and easy cracking at the same deflection amount, the Young's modulus is preferably 130 GPa or less, more preferably 125 GPa or less, and still more preferably 120 GPa or less.

A fracture toughness value of the present chemically strengthened glass is preferably 0.8 MPa·m$^{1/2}$ or more, more preferably 0.85 MPa·m$^{1/2}$ or more, still more preferably 0.9 MPa·m$^{1/2}$ or more, because fragments are less likely to scatter during cracking.

(Composition)

The present chemically strengthened glass is preferably a lithium aluminosilicate glass. That is, a glass for chemical strengthening used in the present chemically strengthened glass is preferably a lithium aluminosilicate glass.

Specifically, a base composition of the present chemically strengthened glass preferably contains $SiO_2$ in an amount of 40% or more, $Al_2O_3$ in an amount of 3% or more, and $Li_2O$ in an amount of 5% or more. Since the lithium aluminosilicate glass contains lithium ions that are alkali ions having the smallest ion radius, a chemically strengthened glass having a preferable stress profile can be obtained by a chemical strengthening treatment in which ions are exchanged using various molten salts.

The base composition of the present chemically strengthened glass preferably contains, in terms of molar percentage based on oxides:

40% to 80% of $SiO_2$;
3% to 30% of $Al_2O_3$;
0% to 5% of $P_2O_5$;
0% to 10% of $B_2O_3$;
5% to 40% of $Li_2O$;
0% to 10% of $Na_2O$;
0% to 5% of $K_2O$;
0% to 5% of MgO;
0% to 5% of CaO;
0% to 5% of SrO;
0% to 5% of BaO;
1% to 5% of $ZrO_2$;
0% to 4% of $SnO_2$; and
0% to 4% of $Y_2O_3$.

In the chemically strengthened glass, a glass composition at a depth of ½ of the sheet thickness t is the same as the base composition of the chemically strengthened glass except for a case where an extreme ion exchange treatment was performed.

Hereinafter, the glass composition will be described.

$SiO_2$ is a component constituting a network of a glass. In addition, $SiO_2$ is a component that increases chemical durability, and is a component that reduces the occurrence of cracks when the glass surface is scratched.

In order to improve chemical durability, the content of $SiO_2$ is preferably 40% or more, more preferably 45% or more, still more preferably 50% or more, yet still more preferably 55% or more, and particularly preferably 60% or more. In order to improve the meltability during glass production, the content of $SiO_2$ is preferably 80% or less, more preferably 75% or less, still more preferably 72% or less, and particularly preferably 70% or less.

$Al_2O_3$ is an effective component from the viewpoint of improving ion exchangeability during chemical strengthening and increasing a surface compressive stress after strengthening.

In order to improve chemical durability and chemical strengthening properties, the content of $Al_2O_3$ is preferably 1% or more, more preferably 3% or more, still more preferably 4% or more, and particularly preferably 5% or more. When the content of $Al_2O_3$ is too high, crystals may tend to grow during melting. In order to prevent a decrease in yield due to devitrification defects and to reduce the haze value of the glass ceramics, the content of $Al_2O_3$ is preferably 30% or less, more preferably 20% or less, still more preferably 15% or less, and particularly preferably 10% or less.

Both $SiO_2$ and $Al_2O_3$ are components that stabilize a structure of the glass, and in order to reduce brittleness, a total content thereof is preferably 43% or more, more preferably 50% or more, still more preferably 55% or more, and particularly preferably 60% or more.

Both $SiO_2$ and $Al_2O_3$ tend to increase a melting temperature of the glass. Therefore, in order to facilitate melting, the total content thereof is preferably 95% or less, more preferably 90% or less, still more preferably 87% or less, yet still more preferably 85% or less, and particularly preferably 82% or less.

$Li_2O$ is a component that forms a surface compressive stress by ion exchange, and is a component that improves the meltability of the glass. When the chemically strengthened glass contains $Li_2O$, a stress profile having a large surface compressive stress and a large compressive stress layer can be obtained by ion-exchanging Li ions of the glass surface with Na ions, and Na ions with K ions.

In order to increase the surface compressive stress during chemical strengthening, the content of $Li_2O$ is preferably 5% or more, more preferably 7% or more, still more preferably 10% or more, and particularly preferably 15% or more.

When the content of $Li_2O$ is too high, a crystal growth rate during glass molding increases, and a problem of a decrease in yield due to devitrification defects may increase. In order to prevent devitrification in a glass production process, the content of $Li_2O$ is preferably 40% or less, more preferably 35% or less, still more preferably 30% or less, still more preferably 25% or less, particularly preferably 22% or less, and most preferably 18% or less.

Neither $Na_2O$ nor $K_2O$ is essential, but $Na_2O$ and $K_2O$ are components that improve the meltability of the glass and decrease the crystal growth rate of the glass, and are preferably contained in order to improve the ion exchangeability.

$Na_2O$ is a component that forms a surface compressive stress layer in a chemical strengthening treatment using a potassium salt, and is also a component that can improve the meltability of the glass. In order to obtain the effect, the content of $Na_2O$ is preferably 1% or more, more preferably 2% or more, still more preferably 3% or more, and yet still more preferably 3.5% or more. When the content of $Na_2O$ is too high, a compressive stress at a relatively deep portion from the surface is difficult to be increased by chemical strengthening, and thus, the content is preferably 10% or less, more preferably 8% or less, still more preferably 5% or less, and particularly preferably 3% or less.

$K_2O$ may be contained for a purpose of preventing devitrification in the glass production process. In a case where $K_2O$ is contained, the content of $K_2O$ is preferably 0.1% or more, more preferably 0.15% or more, and particularly preferably 0.2% or more. In order to further prevent devitrification, the content is preferably 0.5% or more, and more preferably 1.2% or more. Since a large amount of K causes brittleness and a decrease in surface layer stress due to reverse exchange during strengthening, the content of $K_2O$ is preferably 5% or less, more preferably 3% or less, still more preferably 2% or less, yet still more preferably 1% or less, and particularly preferably 0.5% or less.

In order to increase the meltability of the glass, a total content ($[Na_2O]+[K_2O]$) of $Na_2O$ and $K_2O$ is preferably 3% or more, more preferably 3.5% or more, still more preferably 4% or more, and particularly preferably 4.5% or more. When the ($[Na_2O]+[K_2O]$) is too high, a decrease in the surface compressive stress value tends to occur, and thus, the ($[Na_2O]+[K_2O]$) is preferably 15% or less, more preferably 10% or less, still more preferably 8% or less, and particularly preferably 6% or less.

MgO is not essential, but may be contained in order to decrease the viscosity during melting. In a case where MgO is contained, the content of MgO is preferably 1% or more, more preferably 2% or more, and still more preferably 3% or more. When the content of MgO is too high, it is difficult to increase the compressive stress value during the chemical strengthening treatment. The content of MgO is preferably 5% or less, more preferably 4% or less, still more preferably 3% or less, and particularly preferably 2% or less.

CaO is not essential, but is a component that improves the meltability of the glass, and may be contained. In a case where CaO is contained, the content of CaO is preferably 0.1% or more, more preferably 0.15% or more, and still more preferably 0.5% or more. When the content of CaO is excessive, it is difficult to increase the compressive stress value during the chemical strengthening treatment. The content of CaO is preferably 5% or less, more preferably 3% or less, still more preferably 1% or less, and typically 0.5% or less.

SrO is not essential, but is a component that improves the meltability of the glass for chemical strengthening and a component that improves the refractive index of the glass. SrO may be contained because the transmittance of the glass ceramics can be improved by bringing a refractive index of a glass phase remaining after crystallization close to a refractive index of the precipitated crystal. In a case where SrO is contained, the content of SrO is preferably 0.1% or more, more preferably 0.2% or more, still more preferably 0.5% or more, and particularly preferably 1% or more. When the content of SrO is too high, in order to decrease the ion exchange rate, the content of SrO is preferably 5% or less, more preferably 2.5% or less, and still more preferably 1.8% or less.

BaO is not essential, but is a component that improves the meltability of the glass for chemical strengthening and a component that improves the refractive index of the glass. BaO may be contained because the transmittance of the glass ceramics can be improved by bringing a refractive index of a glass phase remaining after crystallization close to a refractive index of the precipitated crystal. In a case where BaO is contained, the content of BaO is preferably 0.1% or more, more preferably 0.2% or more, still more preferably 0.5% or more, and particularly preferably 1% or more. When the content of BaO is too high, in order to decrease the ion exchange rate, the content of BaO is preferably 5% or less, more preferably 2% or less, and still more preferably 1.5% or less.

ZnO is a component that improves the meltability of the glass, and is a component that improves the refractive index of the glass. ZnO may be contained because the transmittance of the glass ceramics can be improved by bringing a refractive index of a glass phase remaining after crystallization close to a refractive index of the precipitated crystal. In a case where ZnO is contained, a content of ZnO is preferably 0.2% or more, and more preferably 0.5% or more. In order to increase weather resistance of the glass, the content of ZnO is preferably 8% or less, more preferably 5% or less, and still more preferably 3% or less.

ZnO, SrO, and BaO tend to deteriorate the chemical strengthening properties, and thus, in order to facilitate chemical strengthening, the total content [ZnO]+[SrO]+[BaO] of ZnO, SrO, and BaO is preferably less than 1%, and more preferably 0.5% or less. It is more preferable that ZnO, SrO, and BaO are not substantially contained.

$ZrO_2$ may not be contained, but is preferably contained from the viewpoint of increasing the surface compressive stress of the chemically strengthened glass. $ZrO_2$ is a component that can form a crystal nucleus in a crystallization treatment. The content of $ZrO_2$ is preferably 0.5% or more, more preferably 1.0% or more, and still more preferably 2% or more. When the content of $ZrO_2$ is too high, the devitrification defects are likely to occur, and the compressive stress value is hardly increased during the chemical strengthening treatment. The content of $ZrO_2$ is preferably 5% or less, more preferably 4% or less, and still more preferably 3% or less.

In order to increase a fracture toughness value, it is preferable to contain at least one of $Y_2O_3$, $La_2O_3$, and $ZrO_2$ in a total amount of 0.2% or more. The total content of $Y_2O_3$, $La_2O_3$, and $ZrO_2$ is preferably 0.5% or more, more preferably 1.0% or more, and still more preferably 1.5% or more. In order to decrease a liquidus temperature and prevent devitrification, the total content thereof is preferably 6% or less, more preferably 5% or less, and still more preferably 4% or less.

In order to decrease a devitrification temperature and prevent devitrification, the total content of $Y_2O_3$ and $La_2O_3$ is preferably larger than the content of $ZrO_2$, and the content of $Y_2O_3$ is more preferably larger than the content of $ZrO_2$.

$Y_2O_3$ is not essential, but it is preferable to contain $Y_2O_3$ in order to decrease the crystal growth rate while increasing the surface compressive stress of the chemically strengthened glass. The content of $Y_2O_3$ is preferably 0.1% or more, more preferably 0.2% or more, still more preferably 0.5% or more, and particularly preferably 1% or more. When the content of $Y_2O_3$ is too high, it is difficult to increase the compressive stress value during the chemical strengthening treatment. The content of $Y_2O_3$ is preferably 10% or less, more preferably 5% or less, still more preferably 4% or less, yet still more preferably 3% or less, particularly preferably 2% or less, and further particularly preferably 1.5% or less.

$La_2O_3$ is not essential, but may be contained for the same reason as $Y_2O_3$. The content of $La_2O_3$ is preferably 0.1% or more, more preferably 0.2% or more, still more preferably 0.5% or more, and particularly preferably 0.8% or more. When the content of $La_2O_3$ is too high, it is difficult to increase the compressive stress value during the chemical strengthening treatment, and thus, the content of $La_2O_3$ is preferably 5% or less, more preferably 3% or less, still more preferably 2% or less, and particularly preferably 1.5% or less.

$TiO_2$ is not essential, but is a component that prevents solarization of the glass, and may be contained. $TiO_2$ is a component that can form a crystal nucleus in a crystallization treatment. In a case where $TiO_2$ is contained, the content of $TiO_2$ is preferably 0.02% or more, more preferably 0.03% or more, still more preferably 0.04% or more, particularly preferably 0.05% or more, and typically 0.06% or more. When the content of $TiO_2$ is more than 2%, the devitrification is likely to occur, and the quality of the chemically strengthened glass may decrease. The content of $TiO_2$ is preferably 2% or less, more preferably 1% or less, still more preferably 0.5% or less, and yet still more preferably 0.25% or less.

$B_2O_3$ is not essential, but may be contained for a purpose of reducing brittleness of glass and improving crack resistance, or for a purpose of improving the meltability of the glass. In a case where $B_2O_3$ is contained, the content of $B_2O_3$ is preferably 0.5% or more, more preferably 1% or more, and still more preferably 2% or more. When the content of $B_2O_3$ is too high, acid resistance tends to deteriorate, and thus the content of $B_2O_3$ is preferably 10% or less. The content of $B_2O_3$ is more preferably 6% or less, still more preferably 4% or less, and particularly preferably 2% or less. It is more preferable that $B_2O_3$ is not substantially contained from the viewpoint of preventing the problem of striae occurring during melting.

$P_2O_5$ is not essential, but may be contained for a purpose of increasing the compressive stress value during chemical strengthening. In a case where $P_2O_5$ is contained, the content of $P_2O_5$ is preferably 0.5% or more, more preferably 1% or more, and still more preferably 2% or more. From the viewpoint of increasing the acid resistance, the content of $P_2O_5$ is preferably 5% or less, more preferably 4% or less, and still more preferably 3% or less. From the viewpoint of preventing striae from occurring during melting, it is more preferable that $P_2O_5$ is not substantially contained.

The total content of $B_2O_3$ and $P_2O_5$ is preferably 0% to 10%, more preferably 1% or more, and still more preferably 2% or more. The total content of $B_2O_3$ and $P_2O_5$ is more preferably 6% or less, and still more preferably 4% or less.

$SnO_2$ has a function of promoting the formation of crystal nuclei, and may be contained. $SnO_2$ is not essential, but in a case where $SnO_2$ is contained, the content of $SnO_2$ is preferably 0.5% or more, more preferably 1% or more, still more preferably 1.5% or more, and particularly preferably 2% or more. In order to prevent devitrification during the melting, the content of $SnO_2$ is preferably 4% or less, more preferably 3% or less, and still more preferably 2% or less.

Each of $Nb_2O_5$, $Ta_2O_5$, $Gd_2O_3$, and $CeO_2$ is not essential, but is a component that prevents solarization of the glass and is a component that improves the meltability. Therefore, one or more selected from $Nb_2O_5$, $Ta_2O_5$, $Gd_2O_3$, and $CeO_2$ may be contained. When these components are contained, the total content thereof is preferably 0.03% or more, more preferably 0.1% or more, still more preferably 0.5% or more, particularly preferably 0.8% or more, and typically 1% or more. When the total content thereof is too high, it is difficult to increase the compressive stress value during the chemical strengthening treatment, and thus the total content is preferably 3% or less, more preferably 2% or less, still more preferably 1% or less, and particularly preferably 0.5% or less.

$Fe_2O_3$ absorbs heat rays, and thus the $Fe_2O_3$ has an effect of improving solubility of the glass, and is preferably contained when the glass is mass-produced using a large melting furnace. In this case, the content of $Fe_2O_3$ is preferably 0.002% or more, more preferably 0.005% or more, still more preferably 0.007% or more, and particularly preferably 0.01% or more, in terms of weight percent based on oxides. On the other hand, coloring occurs when $Fe_2O_3$ is excessively contained, and thus, from the viewpoint of enhancing transparency of the glass, the content of $Fe_2O_3$ is preferably 0.3% or less, more preferably 0.04% or less, still more preferably 0.025% or less, and particularly preferably 0.015% or less, in terms of weight percent based on oxides.

Here, all iron oxide in the glass has been described as $Fe_2O_3$, but in practice, Fe(III) in an oxidized state and Fe(II) in a reduced state are generally mixed. Among these, Fe(III) causes yellow coloring, Fe(II) causes blue coloring, and the glass is colored in green due to the balance therebetween.

Furthermore, a coloring component may be added within a range that does not inhibit the achievement of desired chemical strengthening properties. Preferable examples of the coloring component include $Co_3O_4$, $MnO_2$, NiO, CuO, $Cr_2O_3$, $V_2O_5$, $Bi_2O_3$, $SeO_2$, $CeO_2$, $Er_2O_3$, and $Nd_2O_3$.

The content of the coloring component is preferably 5% or less in total, in terms of molar percentage based on oxides. When the content exceeds 5%, the glass may tend to be devitrified. The content of the coloring component is preferably 3% or less, and more preferably 1% or less. When it is desired to increase the transmittance of the glass, it is preferable that these components are not substantially contained.

$SO_3$, a chloride, a fluoride, or the like may be appropriately contained as a refining agent during melting of the glass. $As_2O_3$ is preferably not contained. When $Sb_2O_3$ is contained, the content of $Sb_2O_3$ is preferably 0.3% or less, more preferably 0.1% or less, and it is most preferable that $Sb_2O_3$ is not contained.

<Method for Producing Chemically Strengthened Glass>

The chemically strengthened glass of the present invention is obtained by chemically strengthening a glass for chemical strengthening. When the present chemically strengthened glass is glass ceramic, the present chemically strengthened glass is produced by subjecting an amorphous glass to a heat treatment to obtain a glass for chemical strengthening, which is glass ceramic, and subjecting the obtained glass ceramic to a chemical strengthening treatment.

(Production of Glass for Chemical Strengthening)

The glass for chemical strengthening can be produced, for example, by the following method.

Glass raw materials are blended so as to obtain a glass having a preferable composition, and the glass raw materials are heated and melted in a glass melting furnace. Thereafter, the molten glass is homogenized by bubbling, stirring, addition of a refining agent, or the like, formed into a glass sheet having a predetermined thickness by a known forming method, and annealed. Alternatively, the molten glass may be formed into a sheet shape by a method of forming the molten glass into a block shape, annealing and then cutting the glass block.

Examples of a method of forming the sheet-shaped glass include a float method, a press method, a fusion method, and a down-draw method. In particular, when a large-sized glass sheet is produced, the float method is preferable. In addition, a continuous forming method other than the float method, such as a fusion method and a down-draw method, is also preferable.

(Crystallization Treatment)

When the glass for chemical strengthening is glass ceramics, the glass ceramics are obtained by subjecting the glass obtained by the above procedure to a heat treatment. The crystallization treatment may be performed after a polishing treatment or the like, which will be described later.

The heat treatment is preferably performed in two to three stages in which the temperature is increased from room temperature to a first treatment temperature, and the glass is held for a certain period of time, and then the glass is held for a certain period of time at a second treatment temperature that is higher than the first treatment temperature.

In a case of a two-stage heat treatment, the first treatment temperature is preferably a temperature range in which a crystal nucleation rate increases in the glass composition, and the second treatment temperature is preferably a temperature range in which the crystal growth rate increases in the glass composition. A holding time at the first treatment temperature is preferably kept long so that a sufficient number of crystal nuclei are generated. When a large number of crystal nuclei are formed, the size of each crystal is reduced, and glass ceramics having high transparency are obtained.

In addition, in a case where glass ceramics of a two-crystal system are obtained, it may be preferable to increase the holding time of the heat treatment accordingly.

The first treatment temperature is, for example, 450° C. to 700° C., and the second treatment temperature is, for example, 600° C. to 800° C. The glass is held at the first treatment temperature for 1 hour to 6 hours, and then, the glass is held at the second treatment temperature for 1 hour to 6 hours.

(Polishing Treatment)

The glass or glass ceramics obtained by the above procedure is subjected to grinding and polishing treatment as necessary to form a glass for chemical strengthening. An uneven shape of the present chemically strengthened glass can be controlled by adjusting polishing conditions of the glass for chemical strengthening. That is, a polishing treatment method of the glass for chemical strengthening may be any method as long as an uneven shape in which (Rku/Hv)× 1000 is 1 or more and 4.4 or less is obtained after chemical strengthening.

Specific polishing conditions under which (Rku/Hv)× 1000 is 1 or more and 4.4 or less can be appropriately adjusted in accordance with the glass to be polished. In order to control the surface unevenness, for example, it is preferable to adjust an average grain size of abrasive grains, a material of a polishing pad, and the like. For example, the average grain size of the abrasive grains is preferably 500 nm or more, and more preferably 800 nm or more, from the viewpoint of obtaining appropriate Rku. The average grain size is preferably 3000 nm or less, and more preferably 2000 nm or less, from the viewpoint of obtaining a beautiful mirror surface. Here, the average grain size refers to a median diameter measured based on a volume distribution using a laser diffraction and scattering method.

For example, it is also a preferable method to mix two or more kinds of abrasive grains to control the surface unevenness.

The type of the polishing pad is not particularly limited, but a pad that can appropriately hold the abrasive grains, such as a pad made of nonwoven fabric, is preferable.

Furthermore, it is also preferable to perform polishing in two or more stages under a plurality of conditions such as using different pads. As an example of the polishing in two or more stages, for example, polishing is performed under the same conditions as a general polishing process in the first stage, and in the second stage, polishing is performed in a short time using a pad different from that in the first stage in order to obtain a desired uneven shape.

It is known that when a glass is polished under the same conditions, there is a correlation between the hardness of the glass and the roughness of the glass surface after polishing. Therefore, the glass having different hardness tends to obtain different surface unevenness even under the same polishing conditions.

After polishing so as to obtain a desired uneven shape, the glass for chemical strengthening is obtained through washing and drying steps.

If the chemically strengthened glass is cut into a predetermined shape and size or subjected to chamfering, it is preferable the glass is cut or subjected to chamfering before the chemical strengthening treatment is performed, because a compressive stress layer is also formed on an end surface by a subsequent chemical strengthening treatment.

(Chemical Strengthening Treatment)

By subjecting the glass for chemical strengthening obtained by the above method to a chemical strengthening treatment, the present chemically strengthened glass is obtained.

The chemical strengthening treatment can be performed by a known method. In the chemical strengthening treatment, a glass sheet is brought into contact with a melt of a metal salt (for example, a potassium nitrate) containing metal ions having a large ionic radius by immersion or the like. Accordingly, metal ions having a small ionic radius in the glass sheet are substituted with metal ions having a large ionic radius. Here, the metal ions having a small ionic radius are typically Na ions or Li ions. The metal ions having a large ionic radius are typically K ions or Na ions, and specifically, K ions for Na ions, and Na ions or K ions for Li ions.

The chemical strengthening treatment (ion exchange treatment) can be performed, for example, by immersing a glass sheet in a molten salt such as potassium nitrate heated to 360° C. to 600° C. for 0.1 to 500 hours. The heating temperature for the molten salt is preferably 375° C. to 500° C., and the immersion time of the glass sheet in the molten salt is preferably 0.3 to 200 hours.

Examples of the molten salt for performing the chemical strengthening treatment include a nitrate, a sulfate, a carbonate, and a chloride. Examples of the nitrate include lithium nitrate, sodium nitrate, potassium nitrate, cesium nitrate, and silver nitrate. Examples of the sulfate include lithium sulfate, sodium sulfate, potassium sulfate, cesium sulfate, and silver sulfate. Examples of the carbonate include lithium carbonate, sodium carbonate, and potassium carbonate. Examples of the chloride include lithium chloride, sodium chloride, potassium chloride, cesium chloride, and silver chloride. One of these molten salts may be used alone, or a plurality thereof may be used in combination.

In the present invention, appropriate treatment conditions of the chemical strengthening treatment may be selected in consideration of the properties and composition of the glass, the kind of the molten salt, and the chemical strengthening properties such as the surface compressive stress and the depth of the compressive stress layer desired for the chemically strengthened glass finally obtained.

In the present invention, the chemical strengthening treatment may be performed only once, or may be performed a plurality of times under two or more different conditions (multistage strengthening). Here, for example, as the chemical strengthening treatment in the first stage, the chemical strengthening treatment is performed under the condition that the DOL is large and the CS is relatively small. Thereafter, as the chemical strengthening treatment in the second stage, when the chemical strengthening treatment is performed under a condition that the DOL is small and the CS is relatively high, an internal tensile stress area (St) can be reduced while increasing the CS of the outermost surface of the chemically strengthened glass, and the internal tensile stress (CT) can be kept low.

The present chemically strengthened glass has excellent film adhesion to a coating film such as an antifouling layer, and thus the present chemically strengthened glass is particularly useful as a cover glass used for a mobile device such as a mobile phone, a smartphone, a personal digital assistant (PDA), and a tablet terminal. Further, the present chemically strengthened glass is also useful for applications such as a cover glass of a display device such as a television (TV), a personal computer (PC), and a touch panel, an elevator wall surface, a wall surface (full-screen display) of a construction such as a house and a building, a building material such as a window glass, a tabletop, an interior of an automobile, an airplane, or the like, which are not intended to be carried, and a cover glass thereof, or a casing having a curved surface shape that is not a sheet shape by bending or forming.

EXAMPLES

Hereinafter, the present invention will be described with reference to Examples, but the present invention is not limited thereto. Example 1 is a Working Example of the present chemically strengthened glass, and Example 2 is a Comparative Example.

(Production of Glass for Chemical Strengthening)

Glass raw materials were blended so as to obtain a glass composition described in terms of molar percentage based on oxides in Table 1 to produce a glass for chemical strengthening.

As the glass raw materials, general glass raw materials such as an oxide, a hydroxide, and a carbonate were appropriately selected and weighed such that the glass has a weight of 900 g.

The mixed glass raw material was placed in a platinum crucible, melted at 1700° C., and defoamed. The glass was allowed to flow on a carbon board to obtain a glass block.

The glass of Example 1 was crystallized in a state of the glass block under the conditions of a temperature raising rate of 5° C./min, 550° C. for 2 hours in a first stage, and 720° C. for 2 hours in a second stage.

Thereafter, the glasses of Examples 1 and 2 were polished under the following conditions to obtain a sheet-shaped glass having a sheet thickness of 0.70 mm.

Polishing machine: small-sized polishing machine 4BF manufactured by HAMAI Co., Ltd.

Abrasive: slurry containing cerium oxide having an average grain size of about 1 μm as abrasive grains (manufactured by Mitsui Mining & Smelting Co., Ltd.)

Polishing pad: nonwoven fabric (manufactured by Fujibo Ehime Co., Ltd)

(Chemical Strengthening Treatment)

The obtained glass for chemical strengthening was chemically strengthened to obtain a chemically strengthened glass. The chemical strengthening was performed under the following conditions.

Example 1: immersion in a molten salt of 99.7% by mass of $NaNO_3$+0.3% by mass of $LiNO_3$ at 450° C. for 2.4 hours.

Example 2: (First stage) immersion in a molten salt of 100% by mass of $NaNO_3$ at 410° C. for 2 hours.

(Second stage): immersion in a molten salt of 99% by mass of $KNO_3$+1% by mass of $NaNO_3$ at 440° C. for 1 hour.

TABLE 1

| (mol %) | Example 1 | Example 2 |
|---|---|---|
| $SiO_2$ | 50.0 | 66.2 |
| $Al_2O_3$ | 5.0 | 11.2 |
| $Li_2O$ | 34.1 | 10.4 |
| $Na_2O$ | 1.8 | 5.6 |
| $K_2O$ | 1.2 | 1.5 |
| $P_2O_5$ | 2.3 | — |
| $ZrO_2$ | 4.5 | 0.5 |
| $Y_2O_3$ | 1.0 | 1.3 |
| MgO | — | 3.3 |

Next, the obtained chemically strengthened glass was evaluated as follows.

(Haze Value)

The haze value (unit: %) under a C light source was measured using a haze meter (HZ-V3, manufactured by Suga Test Instruments Co., Ltd.). Each of the chemically strengthened glasses of Examples 1 and 2 had a haze value of about 0.10%.

(Kurtosis Rku)

The glass surface of the chemically strengthened glass was imaged using an atomic force microscope (AFM, product name: Dimension ICON (manufactured by Bruker)). As a cantilever, a standard product specified by a manufacturer was used. Imaging was performed on a scan area of 5 μm×5 μm at a scan speed of 1 Hz using a dynamic force mode (resolution: 256×256). Using an image analysis software (software name: SPIP manufactured by Image Metrology), the inclination correction was set to the overall surface correction, the captured image was converted into a roughness parameter of a cubic function, and the kurtosis Rku of the surface unevenness of the chemically strengthened glass was calculated in accordance with JIS B0601 (2001).

(Vickers Hardness)

The measurement was performed by using a Shimadzu Micro Vickers hardness meter (HMV-2, manufactured by Shimadzu Corporation) and pressing an indenter under a load of 100 gf for 15 seconds.

The values of Rku, Hv and (Rku/Hv)×1000 of each chemically strengthened glass are shown in Table 2.

(Peel Resistance of Antifouling Layer)

Figure 3:
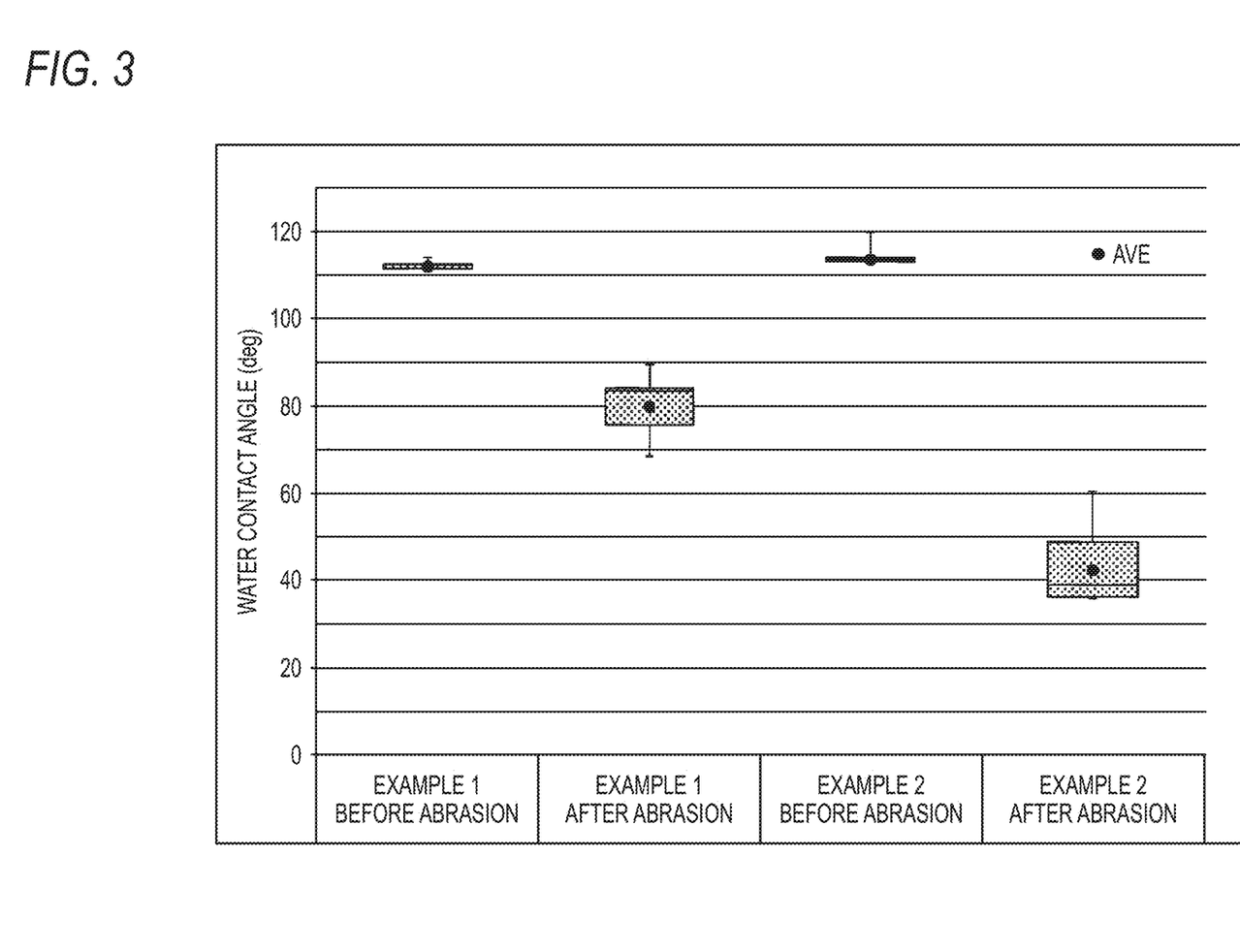
FIG. 3 is a diagram showing results of a peel resistance test of an antifouling layer for the chemically strengthened glasses of Example 1 and Example 2.

Next, an antifouling layer was formed in a range of (5 cm×5 cm) on a surface of the chemically strengthened glass by the following procedure, eraser friction abrasion was performed, and then a water contact angle was measured. Evaluation results are shown in Table 2 and FIG. 3.

((Formation of Antifouling Layer))

A glass sheet washed with water was further subjected to plasma cleaning, and then an organic compound containing fluorine (UD-509 manufactured by Daikin Industries, Ltd.) was deposited by a vacuum deposition method using resistance heating. The pressure in a vacuum chamber during film formation was $3.0 \times 10^{-3}$ Pa, and deposition was performed at a deposition power of 318.5 kA/m$^2$ for 300 seconds. The thickness of the obtained antifouling layer was 15 nm.

((Eraser Friction Abrasion Test))

The surface of the antifouling layer was abraded 7500 times by an eraser having a diameter of 6 mm (Pink Pencil manufactured by WOOJIN Co., Ltd.) under the conditions of a load of 1 kgf, a stroke width of 40 mm, a speed of 40 rpm, and 25° C. and 50% RH using a plane abrasion tester (triple-barreled) (manufactured by Daiei Kagaku Seiki MFG. Co., Ltd., apparatus name: PA-300A). Thereafter, the water contact angle of the surface of the antifouling layer was measured.

((Measurement of Water Contact Angle))

A water droplet of about 1 μL of pure water was dropped on the surface of the antifouling layer, and the contact angle of water was measured using a contact angle meter. The test was performed six times or more, and an average value of the measured values is shown as the water contact angle (°) in Table 2.

TABLE 2

| | | | | Water Contact Angle [°] | |
|---|---|---|---|---|---|
| | Rku | Hv | (Rku/Hv) × 1000 | Before Abrasion | After Abrasion |
| Example 1 | 2.8 | 820 | 3.5 | 112.0 | 79.9 |
| Example 2 | 3.3 | 645 | 5.1 | 113.7 | 42.3 |

In the chemically strengthened glass of Example 1, which is a Working Example, the value of (Rku/Hv)×1000 is 4.4 or less, and the surface unevenness is appropriately controlled, and thus, the water contact angle was large even after eraser friction abrasion, and excellent film adhesion was obtained. On the other hand, in the glass of Example 2 as a Comparative Example, the value of (Rku/Hv)×1000 was larger than 4.4, and thus, the water contact angle after eraser friction abrasion was small, and poor film adhesion was obtained.

Although the present invention has been described in detail with reference to specific embodiments, it is apparent to those skilled in the art that various changes and modifications can be made without departing from the spirit and scope of the present invention.

The invention claimed is:

1. A chemically strengthened glass having a sheet shape, wherein
a haze in terms of a thickness of 0.70 mm is 1.0% or less, and
on at least one main surface of the glass, a ratio (Rku/Hv)×1000 of kurtosis Rku of surface unevenness to Vickers hardness Hv is 1 or more and 4.4 or less.

2. The chemically strengthened glass according to claim 1, being a glass ceramic.

3. The chemically strengthened glass according to claim 2, comprising $SiO_2$—$Al_2O_3$—$Li_2O$-based crystals.

4. The chemically strengthened glass according to claim 2, comprising one or more crystals selected from the group consisting of $LiAlSi_2O_6$, $Li_2Si_2O_5$, and $Al_6O_{13}Si_2$.

5. The chemically strengthened glass according to claim 1, having a base composition comprising, in terms of molar percentage based on oxides:
40% to 80% of $SiO_2$;
3% to 30% of $Al_2O_3$;
0% to 5% of $P_2O_5$;
0% to 10% of $B_2O_3$;
5% to 40% of $Li_2O$;
0% to 10% of $Na_2O$;
0% to 5% of $K_2O$;
0% to 5% of MgO;
0% to 5% of CaO;
0% to 5% of SrO;
0% to 5% of BaO;
1% to 5% of $ZrO_2$;
0% to 4% of $SnO_2$; and
0% to 4% of $Y_2O_3$.

6. A chemically strengthened glass having a sheet shape, wherein
on at least one main surface of the glass, a height frequency distribution of surface unevenness is fitted by two or more normal distribution functions.

7. The chemically strengthened glass according to claim 6, being a glass ceramic.

8. The chemically strengthened glass according to claim 7, comprising $SiO_2$—$Al_2O_3$—$Li_2O$-based crystals.

9. The chemically strengthened glass according to claim 7, comprising one or more crystals selected from the group consisting of $LiAlSi_2O_6$, $Li_2Si_2O_5$, and $Al_6O_{13}Si_2$.

10. The chemically strengthened glass according to claim 6, having a base composition comprising, in terms of molar percentage based on oxides:
40% to 80% of $SiO_2$;
3% to 30% of $Al_2O_3$;
0% to 5% of $P_2O_5$;
0% to 10% of $B_2O_3$;
5% to 40% of $Li_2O$;
0% to 10% of $Na_2O$;
0% to 5% of $K_2O$;
0% to 5% of MgO;
0% to 5% of CaO;
0% to 5% of SrO;
0% to 5% of BaO;
1% to 5% of $ZrO_2$;
0% to 4% of $SnO_2$; and
0% to 4% of $Y_2O_3$.

* * * * *